US005383263A

United States Patent [19]

Sakar

[11] Patent Number: 5,383,263

[45] Date of Patent: Jan. 24, 1995

[54] PRESSURE CONTROL FOR MECHANICAL ARBOR PRESS

[76] Inventor: Josip Sakar, 2424 Mundale Ave., Dayton, Ohio 45420

[21] Appl. No.: 69,433

[22] Filed: Jun. 1, 1993

[51] Int. Cl.[6] .................... B23P 19/02

[52] U.S. Cl. .................... 29/251

[58] Field of Search .................... 29/251, 252; 254/7 R; 192/89 B, 109 R, 53 C; 100/50

[56] References Cited

U.S. PATENT DOCUMENTS

| | | | |
|---|---|---|---|
| 1,106,500 | 8/1914 | Eames | 29/251 |
| 3,962,737 | 6/1976 | James | 254/7 R |
| 4,202,262 | 5/1980 | Claas et al. | 100/50 |
| 5,125,332 | 6/1992 | Beck et al. | 100/50 |

*Primary Examiner*—Robert C. Watson
*Attorney, Agent, or Firm*—William Weigl

[57] ABSTRACT

A conventional arbor press is provided with a friction clutch between its manually-operable lever and the drive shaft which presses a tool on the end of a toothed rack against a product to be worked by the tool. The force applied by the tool may be controlled for each different job through manual adjustment of the clutch to cause it to slip when a predetermined working pressure has been achieved. This assures that adequate pressure has been applied to perform the necessary task, while protecting the product against damage from excessive force. The clutch and its operating and adjusting means may be provided with new arbor presses or in kit form for modifying existing arbor presses in the field.

20 Claims, 1 Drawing Sheet

FIG. 2
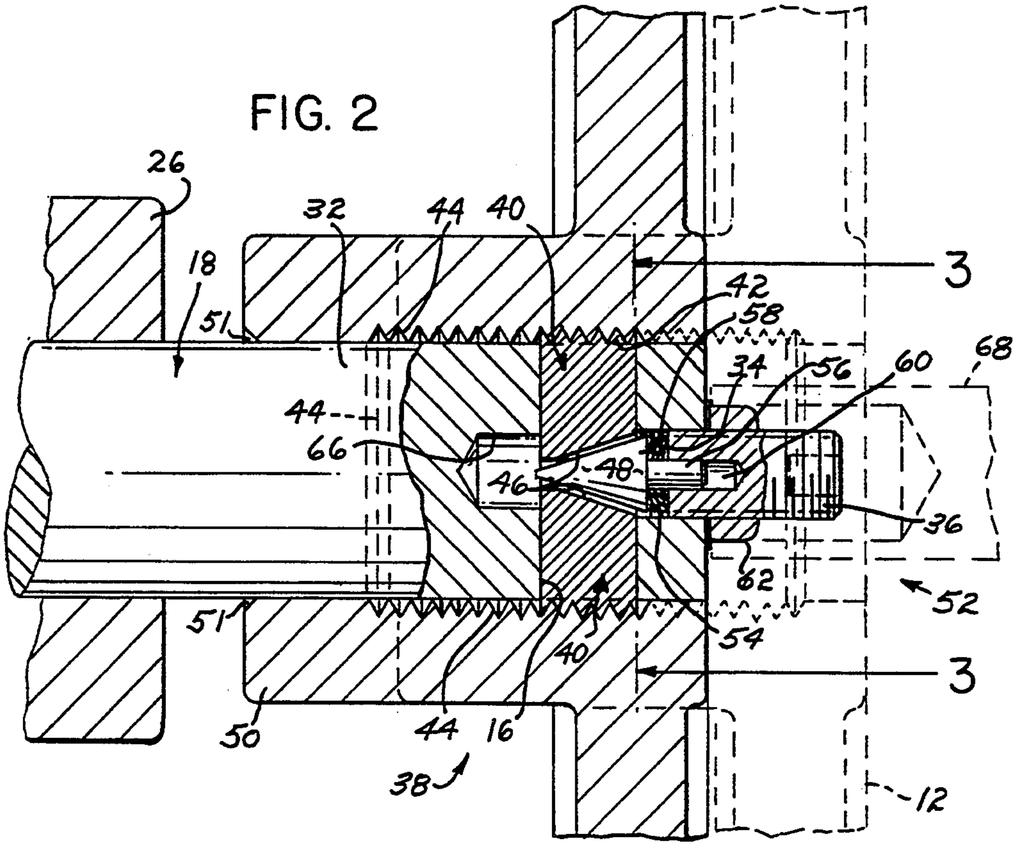
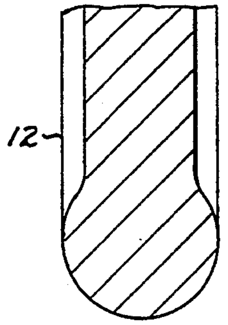
FIG. 1
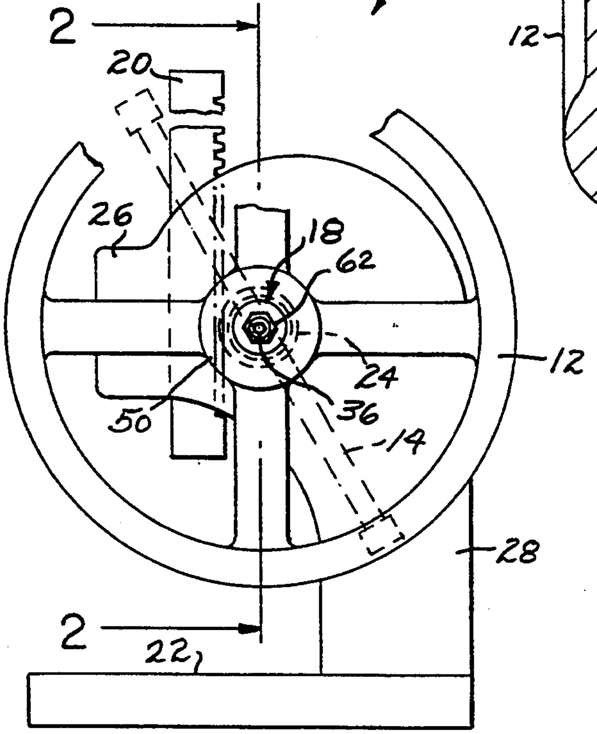
FIG. 5
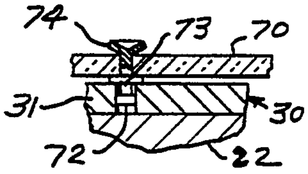
FIG. 4
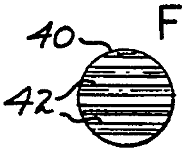
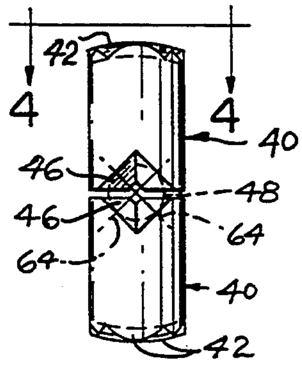
FIG. 3

PRESSURE CONTROL FOR MECHANICAL ARBOR PRESS

This invention relates generally to arbor presses, and in particular to a novel clutching means for controlling the pressure applied by a tool to the product being worked on by such a press.

BACKGROUND OF THE INVENTION

A typical arbor press applies pressure by means of a tool on an end of a rack to a product on which work is to be performed. Such a press typically has a manually-operable shaft-type handle pulled toward the operator to force the tool into pressure engagement with the product. Especially in smaller arbor presses, e.g., of the range which apply less than fives tons pressure, the operator determines the actual end pressure applied by "feel" and/or viewing the working of the product in order to know when to discontinue pressure application. While this is acceptable for many types of jobs, in certain applications, the pressure control must be precise. An example of the need for precision-controlled pressure is where electrically-conducting terminals are being applied to a fiberglass-rosin circuit board. Such boards are subject to cracking or crazing around a hole provided for the terminal if excessive pressure is applied. Alternatively, if insufficient pressure is applied, the terminal may not be tight enough and problems may arise because of the terminal's looseness. Because the pressure "feel" of one person can be substantially different from that of another, where different individuals are producing a large quantity of the same product, batch inconsistencies can result. This can be quite detrimental, especially where product quality is of great importance as, for example, in the manufacture of parts which are to be used in sophisticated electronic controls.

SUMMARY OF THE INVENTION

A conventional arbor press is provided with a friction clutch between its manually-operable lever and drive shaft, for pressing a tool on the end of a toothed rack against a product to be worked by the tool. The clutch and its operating means may be provided either with new presses or as a kit for modifying existing presses in the field. In its preferred form, the operating means consists of a hand-wheel having a hub fitting over an extended end of the drive shaft. The internal cylindrical surface of the hub is provided with a plurality of adjacent annular V-grooves. A cross-hole through the end of the drive shaft supports a pair of radially-movable clutching members having ribs at their outer ends which are normally forced into friction contact with the V-grooves in the hub's internal surface. A conical wedge cam is urged axially inwardly of the shaft extended end against corresponding cam surfaces on the clutching members to obtain and maintain pressure contact between the grooves and ribs through spring pressure created by a stack of Belleville spring washers. Adjusting means is provided to place the spring force of the washers under a predetermined pressure which enables the handwheel to slip on the shaft whenever the pressure of the tool against the product being worked reaches a predetermined pressure for which the friction clutch has been set. The handwheel may be adjusted axially along the shaft to accommodate product extending into the area of the handwheel by declutching the radially-movable members to permit them to recede within the cross-hole, moving the handwheel to a new location along the shaft and then reengaging the clutching grooves and ribs. Declutching is possible when the conical wedge cam has its pressure against the cam surfaces released and is moved away from the clutching members sufficiently to enable them to recede within the cross-hole below or within the shaft surface.

It is an object of this invention to provide an arbor press with a friction clutching mechanism between the operating lever and the pressure-applying rack to enable the pressure applied by a tool to a product to be worked to be maintained at a predetermined maximum level from production of one product to the next.

Another object of the invention is to provide a particular design of friction clutching mechanism between the manually-operable leverage-applying means of an arbor press and its drive shaft, the particular clutching means being capable of being adapted to standard arbor presses in kit form with only minor alterations to existing equipment.

A further object is to provide a novel wet friction clutching mechanism between the drive shaft and lever of an arbor press.

Still another object is to provide a novel friction clutching mechanism which enables the manually-operable lever to be axially positioned in different locations along the shaft to avoid interference of the lever with the product being worked, Other objects and advantages will become apparent from the following description, in which reference is made to the accompanying drawings.

DESCRIPTION OF THE DRAWINGS

FIG. 1 is a simplified side elevational view of a standard arbor press with which the invention may be used.

FIG. 2 is a fragmentary enlarged cross-sectional view of the details of the clutching mechanism of my invention, and is taken substantially along lines 2—2 of FIG. 1.

FIG. 3 is a view of the radially-movable clutching members of my invention, taken looking in the direction of arrows 3—3 of FIG. 2.

FIG. 4 is a top view of one of the members shown in FIG. 3, taken looking down along lines 4—4.

FIG. 5 is a cross-sectional view of one type of product which may be produced through use of my improved pressure controls.

DETAILED DESCRIPTION OF THE PREFERRED EMBODIMENT

One type of machine with which my invention is particularly useful is a conventional arbor press 10 of FIG. 1. The only difference between the functional parts of a standard press and the one viewed in FIG. 1 is the substitution of a manually-operable handwheel 12 for the conventional shaft handle 14 (shown in dotted lines) and the addition of the clutching mechanism to be described. The shaft handle 14 typically passes through a cross-hole 16 in a drive shaft 18, as shown more clearly in FIG. 2. Both handwheel 12 and handle 14 comprise the main leverage-applying members for creating downward force through a toothed rack 20 toward a base 22. The rack 20 and a pinion 24 are mounted in a cantilevered arm 26 mounted on and typically integral with an upright column 28 or beam fixed to one side of the base 22. Conventionally, the teeth of pinion 24 are machined into the shaft and integral therewith. A product, one type of which is shown as a fiberglass-rosin circuit board 30 in FIG. 5, is normally fixed on a supporting means 31 on the base 22, and a work-performing tool (not shown) is mounted on the lower end of the rack 20. When leverage is applied to the handwheel 12 in a counterclockwise direction as viewed in FIG. 1, the drive shaft 18 is rotated to cause pinion 24 to move rack 20 downwardly and press a tool on the lower end of the rack 20 into pressure contact with the product mounted on the base. This pressure can result in many different types of actions, such as swaging or other deforming of metal, or can be designed to press one part onto or into another, as is commonly understood in the machine operations field. Also, while I have illustrated an upright press, the pressure application can be vertically upward, horizontal or in any other direction. Other types of equipment may also find uses for the improvements now about to be described.

FIG. 2 is an enlarged view of an extended end 32 of drive shaft 18, i.e., the end remote from the teeth of pinion 24. Many manufacturers have standardized on the diameter of the drive shaft, making my improved system applicable to a large number of conventional arbor presses. As already stated, the conventional shaft 18 has a cross-hole 16 through which the handle 14 passes. The drive shaft 18 is also normally provided with a threaded hole 34 which connects axially with the cross-hole 16 and enables and thumb screw (not shown) threaded into the hole 34 to secure the handle 14 in a selected position to obtain a desired leverage. The only change I have found it necessary to make in modifying many standard arbor presses to enable them to receive my invention in kit form is to increase the diameter of the threaded hole 34. Otherwise, the invention can be either built into original equipment or can be used to improve the characteristics of existing field presses and allow them to perform more precision work than heretofore. The changes are relatively simple in the case where a field press is modified. First, the handle 14 is removed and the hole 34 is drilled larger and retapped with threads to accommodate a modified set screw 36. Any shop with an arbor press has the capability of performing such a simple operation to modify the press 10.

Since the invention is likely to find its greatest impact as a retrofit for the very large numbers of conventional field presses, it will now be described as though the parts have been received in a box in kit form for attachment to an existing machine. After the old handle 14 has been removed and the hole 34 has been drilled and retapped, a clutching mechanism 38 is installed. The parts about to be described are all part of such a kit. First, a pair of cylindrical radially-movable bearing brass clutching members 40 are inserted into the cross-hole 16. This is preferably done with the cross-hole 16 positioned horizontally to avoid the effects of gravity on the members 40. The shaft may be marked in any manner to show the direction of the cross-hole 16 whenever the cross-hole is covered. As seen in FIG. 3, the members 40 have what would appear to be screw threads on their ends which extend outwardly of the cross-hole 16 when positioned therein. Reference is made to the "appearance" of screw threads, but the clutching surfaces are not helical like screw threads. By making them in this shape, the frictional surface area of the clutching mechanism can be maximized. They are, in fact, V-shaped annular ribs 42 on members 40 which frictionally engage with V-shaped annular grooves 44, the annularity of which is best shown at the left in dotted lines in FIG. 2. The purpose of using ribs and grooves will also be discussed later in connection with adjustability of the handwheel 12 along drive shaft 18. Suffice it to say that the ribs and grooves inhibit axial movement of the handwheel relative to the drive shaft when the ribs and grooves are engaged. The members 40 are placed in the cross-hole 16 with semi-pyramidal notches 46 facing rightwardly as viewed in FIG. 2. A conical wedge camming member 48 is then inserted into the hole 34 for purposes of maintaining the members 40 non-rotational in cross-hole 16 in the relationship they will eventually occupy in FIG. 2. This is best accomplished with the cross-hole 16 being horizontal at the time the members 40 are inserted. Now, by keeping members 40 (which are capable of turning within cross-hole 16 if not restrained against doing so by the conical wedging member 48) inwardly of the outer surface of drive shaft 18, the handwheel 12 can be placed onto the end of the shaft 18 from the right and slid leftwardly to its full-line position of FIG. 2. The inner diameter of a hub portion 50 of handwheel 12 is provided with the frictional grooved surface extending for a major portion of the hub's length. The hub portion 50 is also angled at its left inner edge at 51 to assist in guiding the hub portion onto the shaft 18. The grooves are produced at the standard screw pitch angle of sixty degrees for simplicity of production, but can be any angle and might even be just a cylindrical inner diameter, except that it is desirable to have as large an area of frictional contact as possible because of the high pressure loads in larger tonnage presses. The sixty degree V ribs and grooves provide this feature. Once the handwheel 12 has been placed over the members 40, it can be located in any axial position within the range of grooves 44 along the shaft 18, depending on the work to be performed and the necessity to avoid contact of the handwheel 12 with the product. As the grooves 44 wear, the hub may also be moved axially to present a new grooved section to the ribs 42 of the clutching members 40. Let us assume it has been positioned as shown in FIG. 2 in full lines. At this point, wedge member 48 must now move the members 44 radially outwardly to cause ribs 42 to contact grooves 44 and interengage their frictional surfaces under pressure contact. This can be accomplished by urging the member 48 to the left as viewed in FIG. 2. Since the ribs and grooves can be misaligned initially, provided they begin to engage by radially outward movement of the clutching members 40, the remaining pressure engagement can be brought about by an adjusting mechanism 52. Once rib and groove engagement has occurred, the hub takes a fixed position on drive shaft 18 and can no longer be moved axially without the clutching members 40 being fully returned radially inward of the cross-hole 16, i.e., by the ribs 42 being inside the outer diameter surface of drive shaft 18.

After the handwheel 12 has been installed over shaft 18, a spring-biasing means in the form of a stack of Belleville spring washers 54 are placed over a reduced diameter cylindrical portion 56 formed into the conical wedge member 48. Member 48 is produced on a lathe and is turned from a single piece for ease of manufacturing. The turning forms a shoulder 58 against which one end of the stack of washers 54 abuts. Various spring washers and stack sizes can be used to best suit particular situations encountered. It will be noted that the outer diameter of the washers 54 is smaller in diameter than the conical portion at the shoulder 58, so that the washers will avoid contact with the semi-pyramidal surfaces of the notches 46 in the event the frictional and other surfaces are so worn after a long period of use that the washers are inside the notches 46 and cross-hole 16.

To apply pressure contact of the frictional surfaces of the clutching mechanism 38, the set screw 36 is threaded into hole 34 to have the innermost end of the screw 36 abut and form a seat for the end of the stack of Belleville spring washers 54 opposing the shoulder 58. A standard set screw has been modified to provide a pilot hole 60 which is drilled into the inner end of set screw 36 to act as a guide for the cylindrical portion 56 of the wedging member 48. In known fashion, the tighter the washers 54 are compressed, the greater the pressure applied at the frictional contacting surfaces formed by the ribs 42 and grooves 44. As is conventional in frictional clutches, the spring pressure determines the stalling force on the drive shaft 18 at which the clutching mechanism 38 will slip. The stalling force is the desired predetermined ending force or pressure of the tool against the product being worked on the base 22. Thus, by further turning screw 36 inwardly, the predetermined working pressure is increased, and by backing off the screw 36, the predetermined working pressure is decreased. Of necessity, a jam nut 62 and associated lock washer are provided to retain the pressure setting of set screw 36 once the predetermined pressure has been established.

The clutching mechanism 38 is preferably a "wet" clutch, i.e., one with which solid lubricant such as grease is used on the frictionally-engaging parts. This increases clutch life, since the clutch is designed to slip on each individual press operation. In addition to longer life, a wet clutch avoids the squeal commonly attending slippage present in dry clutches. Also, clutching members 40 are preferably made of sintered bearing brass material in order to better retain lubricant.

In FIG. 3, it will be noted that there are four dot-dash camming lines 64 where the conical part of the wedge member 48 contacts each one of the surfaces created by the notches 46. While it is possible to use other camming surfaces than those illustrated, I prefer to employ the conical shape of the member 48 and the semi-pyramidal shape of the notches 46 to serve several functions. These shapes hold the clutching members 40 against rotation in cross-hole 16 during initial assembly. Subsequently, they provide four distinct lines of contact, reducing part wear. As the parts wear, particularly at the ribs 42 and grooves 44, the wedging member 48 will extend further to the right from where it is shown in FIG. 2. To accommodate this wear, a recess 66 can be drilled into the drive shaft 18. This can be easily accomplished at the time the shaft is originally drilled to enlarge the threaded hole 34.

Let us now assume that the parts are in their full-line positions of FIG. 2 and an interference is in the offing between the handwheel 12 and a product on the base 22. The handwheel must then be moved toward the dotted-line position of FIG. 2 to accommodate the oversized product. This can be accomplished by loosening the jam nut 62 and backing off the set screw 36. This frees the pressure of the wedge cam member 48 against the camming lines 64 and results in the ribs 42 being freed of pressure against the grooves 44. When backed off sufficiently for the ribs 42 of both members 40 to be totally radially within the outer surface of the shaft 18, the angles of the ribs and grooves allows for the handwheel 12 to be drawn toward the right. This is done by jiggling the handwheel as it is moved rightwardly in order to have the lower one of the two clutching members (if cross-hole 16 is other than horizontal at the time) lift its ribs from the corresponding grooves of the hub 50, into which they may remain due to gravity. Ideally, both during initial assembly and during shaft repositioning, the cross-hole 16 should be arranged to be horizontal, so that gravity has no affect on the members 40. As noted earlier, the shaft 18 can be marked to enable determination that the cross-hole is horizontal at these times. Thus, at the time of such repositioning of the handwheel along drive shaft 18, the sixty degree angle of the ribs and grooves can also serve the additional function of camming the ribs and the lower member 40 inwardly to allow the readjustment. Once the handwheel has been moved outwardly to the desired distance to avoid further interference, it then is necessary to establish or reestablish the predetermined pressure at which the handwheel will slip relative to the shaft. With the handwheel in the dotted-line position of FIG. 2, a socket 68 (also in dotted lines) and associated socket wrench are used to finally tighten the jam nut 62. Jam nut 62 can be any shape, but is preferred to be hexagonal for convenience and low cost. In order to apply the socket over and around the adjusting end of screw 36 without affecting its preset pressure adjustment angularity, the socket 68 must pass freely over the screw 36. To this end, screw 36 is a common set screw with a recess in its adjusting end for receipt of a conventional tool for making the adjustment. A socket wrench is the easiest tool to use for tightening the jam nut 62, and the set screw 36 is the most effective and inexpensive way of allowing the socket 68 to pass freely over the adjusting end of the screw 36.

One type of manufactured part which is very critical because of its use for an electronic circuit board for a missile arming device, and which could not be satisfactorily produced within government specifications by means of a standard arbor press is shown in enlarged cross-sectional fashion in FIG. 5. The board 30 is a fiberglass-rosin sheet or plate 70 to which an electrically-conducting terminal 72 is to be attached. A hole is provided in the plate 70 to receive the terminal. The head of the terminal 72 is shouldered at 73 to provide a seat for the terminal in the supporting means 31 on base 22. The terminal is inserted with its end to be swaged as at 74 facing upwardly toward a swaging tool (not shown) on the lower end of the rack 20. When the handwheel 12 is turned to swage the upper end of the terminal, as soon as the predetermined pressure level is achieved, clutch mechanism 38 slips. Further manual turning of the handwheel beyond the point at which is slips has no pressure effect on the product.

While I have illustrated my preferred form of the clutching mechanism 38, various changes may be made without departing from the spirit and scope of the invention.

Having described my invention, I claim:

1. In an arbor press having a base for supporting a product against which a predetermined pressure is to be applied to physically work the product, a beam extending essentially perpendicularly away from one side of said base, a cantilevered arm supported on said beam and having an end generally coextensive with said base, a toothed rack slidably supported by said arm for longitudinal movement toward and away from said base, said rack being capable of mounting a tool on its end nearest said base for working said product, a pinion mounted for rotation on said arm and meshing with and moving said rack in response to rotation thereof, a shaft for rotating said pinion to apply pressure from said tool to said product through said rack, said shaft having an extended end remote from said pinion, and manually-operable means on said extended shaft end for applying leverage to said shaft to urge said rack and tool toward and into contact with said product, the improvement consisting of pressure control means comprising:

clutch means comprising a driven member connected to said extended shaft end and a driving surface connected to said manually-operable leverage means and in constant engagement with a clutching surface of said driven member; and spring biasing means for maintaining the torque required to be applied by said leverage means to said shaft until the pressure applied to said product by said tool has reached said predetermined pressure;

said clutch means being responsive to the pressure applied by said tool to said product for causing said driving surface and said manually-operable leverage means to slip relative to said shaft and thereby prevent further shaft rotation after said predetermined pressure of said tool against said product has been reached.

2. The invention according to claim 1 wherein at least one of said clutch elements has a solid lubricant-retaining capability, said at least one element being provided with such a solid lubricant.

3. The invention according to claim 2 wherein said frictionally-engaging elements include interengaging surfaces inhibiting movement of said manually-operable means axially relative to said shaft.

4. The invention according to claim 1 wherein said shaft has a cross-hole extending perpendicularly of the shaft axis through the shaft adjacent said extended end, at least one radially-movable member in said cross-hole, wherein said manually-operable leverage means comprises a hub mounted on said shaft and covering said cross-hole, said hub having a generally cylindrical inner friction surface and the outermost end of said member having a cooperating generally cylindrical friction surface in contact therewith for frictionally driving said shaft with said manually-operable means in response to operation thereof until said predetermined pressure is reached, and wherein said spring biasing means includes means applying a predetermined radially-outward spring bias to said radially-movable member to enable said friction surfaces to slip upon reaching of said predetermined pressure.

5. The invention according to claim 4 wherein said cross-hole and said radially-movable member are cylindrical.

6. The invention according to claim 4 wherein said frictionally-engaging elements include interengaging surfaces inhibiting movement of said manually-operable means axially relative to said shaft.

7. The invention according to claim 6 wherein said inhibiting surfaces comprise at least one annular groove on one of said cylindrical friction surfaces and at least one cooperating annular rib engaging said groove on the other of said surfaces.

8. The invention according to claim 7 wherein there are a plurality of adjacent said grooves and ribs laterally spaced parallel to said shaft, and wherein said hub may be repositioned axially along said shaft with different grooves and ribs in engagement whereby said manually-operable leverage means may be made to avoid interference with product supported on and extending from said base toward said manually-operable means.

9. The invention according to claim 8 wherein said grooves and ribs a V-shaped in cross-section and are provided with lubricant on their surfaces.

10. The invention according to claim 4 wherein a pair of such radially-movable members are provided in said cross-hole, each one of said pair extending essentially from the axis of said shaft to the outer perpiphery thereof.

11. The invention according to claim 10 wherein the inner ends of said radially-movable members are angled to provide a cam surface on each member, and wherein a wedge cam movable axially of the shaft relative to the end thereof is provided to maintain contact between the friction surfaces, and wherein said spring bias applies a force directed inwardly of the extended end of said shaft to predetermine the force at which said friction clutch means begins to slip.

12. The invention according to claim 11 wherein said wedge cam is conical.

13. The invention according to claim 12 wherein said conical wedge cam has a cylindrical portion of reduced diameter directed toward said shaft extended end, wherein a shoulder is provided at the juncture of said cylindrical portion and said conical wedge cam, and wherein said spring biasing means comprises at least one Belleville spring washer means slidably mounted on the cylindrical portion of said wedge cam.

14. The invention according to claim 13 wherein a threaded member is directed inwardly from the end of said shaft toward said cross-hole, said threaded member having a cylindrical guide opening at the innermost end thereof for receiving the end of the cylindrical portion of said wedge cam remote from said conical portion, and wherein the end of the threaded member surrounding said guide opening comprises a pressure seat retaining said Belleville washer means under compression between said pressure seat and said shoulder.

15. The invention according to claim 14 wherein said threaded member is adjustable axially relative to said shaft to vary said predetermined pressure by varying the compression of said Belleville spring washer means.

16. The invention according to claim 15 wherein said Belleville spring washer means comprises a plurality of stacked Belleville spring washers.

17. The invention according to claim 16 wherein a lock nut is provided on said threaded member adjacent the extended shaft end to maintain the adjustment of said member and thereby the predetermined pressure to which the spring bias has been adjusted.

18. The invention according to claim 17 wherein said jam nut is hexagonal and said threaded member is cylindrical and has a socket head end of an outer diameter smaller than the distance between a pair of opposing flat sides of the hexagonal nut.

19. The invention according to claim 18 wherein said interengaging surfaces comprise a plurality of grooves on said hub and ribs on said radially-movable members inhibiting movement of said leverage means axially relative to said shaft, and wherein said threaded member may be moved outwardly of said shaft to enable said Belleville washers and wedge cam to discontinue radially outward pressure on said cam surfaces, thereby enabling the ribs on said radially-movable members to disengage from said grooves in said hub and enable the axial relation of said hub and said shaft to be altered.

20. The invention according to claim 19 wherein said cam surface on each radially-movable member forms a semi-pyramidal shape having opposed flat sides, whereby said conical wedge cam is maintained in line contact with each of said opposed flat sides of each radially-movable member when pressure is applied through said threaded member to compress said Belleville washers.

* * * * *